US009112909B2

(12) United States Patent
Kaippallimalil et al.

(10) Patent No.: US 9,112,909 B2
(45) Date of Patent: Aug. 18, 2015

(54) USER AND DEVICE AUTHENTICATION IN BROADBAND NETWORKS

(75) Inventors: John Kaippallimalil, Richardson, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1858 days.

(21) Appl. No.: 12/200,347

(22) Filed: Aug. 28, 2008

(65) Prior Publication Data

US 2011/0173678 A1 Jul. 14, 2011

Related U.S. Application Data

(60) Provisional application No. 61/028,472, filed on Feb. 13, 2008.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| H04L 12/24 | (2006.01) |
| G06F 21/31 | (2013.01) |
| H04W 12/06 | (2009.01) |
| H04W 12/08 | (2009.01) |

(52) U.S. Cl.
CPC .............. *H04L 63/18* (2013.01); *G06F 21/31* (2013.01); *H04L 41/0896* (2013.01); *H04L 63/102* (2013.01); *H04L 63/162* (2013.01); *H04W 12/06* (2013.01); *G06F 2221/2105* (2013.01); *G06F 2221/2129* (2013.01); *G06F 2221/2141* (2013.01); *G06F 2221/2149* (2013.01); *H04L 63/0272* (2013.01); *H04L 63/0876* (2013.01); *H04L 63/105* (2013.01); *H04W 12/08* (2013.01)

(58) Field of Classification Search
None
See application file for complete search history.

(56) References Cited

U.S. PATENT DOCUMENTS

| | | | | |
|---|---|---|---|---|
| 7,721,329 | B2 * | 5/2010 | Toomey | 726/9 |
| 7,876,772 | B2 * | 1/2011 | Kwan | 370/449 |
| 2006/0041742 | A1 * | 2/2006 | Oba | 713/151 |
| 2007/0237093 | A1 * | 10/2007 | Rajagopalan et al. | 370/254 |

(Continued)

OTHER PUBLICATIONS

Fajardo, V. Ed, et al., "Simple PANA PAA Discovery Protocol," IETF Protocol for Carrying Authentication for Network Access (PANA), Internet Draft, draft-fajardo-pana-paa-discovery-00.txt, Jan. 31, 2008, 6 pages.

(Continued)

*Primary Examiner* — Nadia Khoshnoodi
(74) *Attorney, Agent, or Firm* — Conley Rose, P.C.; Grant Rodolph; Brandt D. Howell (57) ABSTRACT

A network component comprising at least one processor configured to implement a method comprising granting a user restricted access at a reduced rate without authenticating the user, attempting to authenticate the user, and granting the user unrestricted access at a full rate if the user authentication is successful. Included is a method comprising authenticating a user device, a user line, or both using a first communication, and authenticating a user using a second communication separate from the first communication. Also included is an apparatus comprising an access node (AN) configured to couple to an access network and communicate with a user equipment (UE) via the access network, wherein the UE is authenticated using either line authentication or device authentication based on the access network.

21 Claims, 7 Drawing Sheets

(56) References Cited

U.S. PATENT DOCUMENTS

| | | | |
|---|---|---|---|
| 2008/0172732 A1* | 7/2008 | Li et al. | 726/15 |
| 2009/0059935 A1* | 3/2009 | Dec | 370/401 |

OTHER PUBLICATIONS

Morand, L., et al., "Application of PANA Framework to DSL Networks," IETF PANA Working Group, Internet Draft, draft-morand-pana-panaoverdsl-02, May 16, 2008, 19 pages.

Morand, L., et al., "DHCP Options for PANA Authentication Agents," draft-ietf-dhc-paa-option-05, Dec. 18, 2006, 9 pages.

Morand, L., et al., "DHCP Options for Protocol for Carrying Authentication for Network Access (PANA) Authentication Agents," RFC 5192, May 2008, 9 pages.

Forsberg, D., et al., "Protocol for Carrying Authentication for Network Access (PANA)," draft-ietf-pana-pana-18, Sep. 6, 2007, 50 pages.

Forsberg, D., et al., "Protocol for Carrying Authentication for Network Access (PANA)," RFC 5191, May 2008, 47 pages.

Bradner, S., "Key Words for Use in RFCs to Indicate Requirement Levels," BCP 14, RFC 2119, Mar. 1997, 3 pages.

Droms, R., "Dynamic Host Configuration Protocol," RFC 2131, Mar. 1997, 43 pages.

Droms, Ed., et al., "Dynamic Host Configuration Protocol for IPv6 (DHCPv6)," RFC 3315, Jul. 2003, 95 pages.

Aboba, B., et al., "Extensible Authentication Protocol (EAP)," RFC 3748, Jun. 2004, 68 pages.

Jayaraman, P., et al., "Protocol for Carrying Authentication for Network Access (PANA) Framework," draft-ietf-pana-framework-10, Sep. 6, 2007, 17 pages.

Jayaraman, P., et al., "Protocol for Carrying Authentication for Network Access (PANA) Framework," RFC 5193, May 2008, 11 pages.

Parthasarathy, M., "PANA Enabling IPsec Based Access Control," draft-ietf-pana-ipsec-07.txt, Jul. 2005, 17 pages.

Narten, T., et al., "Neighbor Discovery for IP Version 6 (IPv6)," RFC 2461, Dec. 1998, 87 pages.

Cheshire, S., et al., "Dynamic Configuration of IPv4 Link-Local Addresses," RFC 3927, May 2005, 31 pages.

Yegin, Ed., et al., "Protocol for Carrying Authentication for Network Access (PANA) Requirements," RFC 4058, May 2005, 19 pages.

DSL Forum TR-101, "Migration to Ethernet-Based DSL Aggregation," Apr. 2006, 101 pages.

DSL Forum TR-025, "Core Network Architecture Recommendations for Access to Legacy Data Networks Over ADSL," Sep. 1999, 24 pages.

DSL Forum TR-059, "DSL Evolution—Architecture Requirements for the Support of QoS-Enabled IP Services," Sep. 2003, 52 pages.

DSL Forum WT-134 Revision 2, "Policy Control Framework for DSL," Apr. 2006, 67 pages.

DSL Forum WT-146 Draft Version 1.0, "IP Sessions," Feb. 2006, 19 pages.

* cited by examiner

USER AND DEVICE AUTHENTICATION IN BROADBAND NETWORKS

CROSS-REFERENCE TO RELATED APPLICATIONS

The present application claims priority to U.S. Provisional Patent Application Ser. No. 61/028,472 filed Feb. 13, 2008 by John Kaippallimalil and entitled "User and Device Authentication in Broadband Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some communication networks, such as Internet Protocol (IP) networks or other broadband access networks, are configured to support Internet access and similar IP based services. In these networks, a user is granted access only upon successful authentication without regard to any emergency needs. Some of these networks, such as fixed networks, provide access and services to a subscriber or an authorized user by authenticating the user's device or the user's line instead of the user or the user's identity. Other networks, such as wireless networks, authenticate the user or his identity regardless of the device or line used, thus providing access to roaming or mobile users. However, new features or services are being added to these networks, such as emergency service support for unsubscribed or unauthorized users, roaming access for mobile or roaming users in fixed networks, or other features or services. Such features or services may require improving some of the networks' architectures.

SUMMARY

In one embodiment, the disclosure includes a network component comprising at least one processor configured to implement a method comprising granting a user restricted access at a reduced rate without authenticating the user, attempting to authenticate the user, and granting the user unrestricted access at a full rate if the user authentication is successful.

In another embodiment, the disclosure includes a method comprising authenticating a user device, a user line, or both using a first communication, and authenticating a user using a second communication separate from the first communication.

In yet another embodiment, the disclosure includes an apparatus comprising an access node (AN) configured to couple to an access network and communicate with a user equipment (UE) via the access network, wherein the UE is authenticated using either line authentication or device authentication based on the access network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for providing a UE with restricted access to a network without authenticating a user. The restricted access may comprise a reduced rate in comparison to the full rate available with an unrestricted access. The restricted access may be limited to a server, a service, a protocol, or combinations thereof. The restricted access may be granted upon authenticating the UE or a user line. The system may subsequently attempt to authenticate the user, and if authentication is successful, the user may be granted unrestricted access. The user device or user line authentication may be established using separate communications from that of the user authentication, for instance using different network security layers. Further, the UE may be authenticated using either line authentication or device authentication based on the type of access network. Specifically, line authentication may be used in some access networks where the UE communicates with the access network via a residential gateway (RG) using a trusted link. Alternatively, device authentication may be used when the UE communicates with the access network using a non-trusted link with the RG, or when the access network is a wireless network. The methods described herein may be implemented using PANA, if desired.

Figure 1:
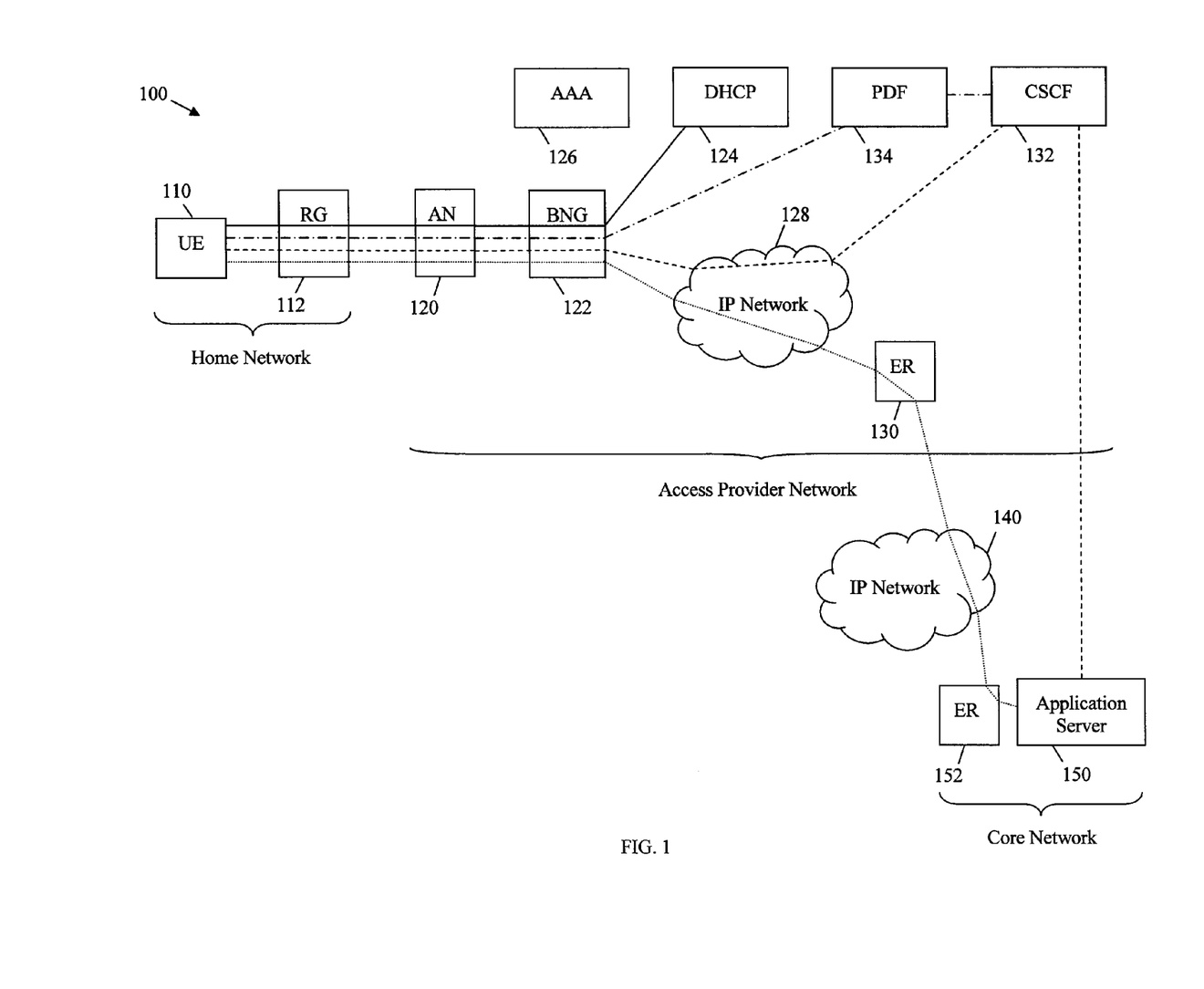
FIG. 1 is a schematic diagram of an embodiment of a restrictive access system.

FIG. 1 illustrates one embodiment of a restrictive access system 100, which may provide a user with restricted access to a network. The restrictive access system 100 may comprise at least one UE 110 and a residential gateway (RG) 112, which may be part of or reside in a home or neighborhood network. The restrictive access system 100 may comprise an AN 120, a broadband network gateway (BNG) 122, which may be part of or belong to an access provider network. Additionally, the restrictive access system 100 may comprise a Dynamic Host Configuration Protocol (DHCP) server 124, an Authentication, Authorization and Accounting (AAA) server 126, a first IP network 128 coupled to a first Edge Router (ER) 130, a Call State Control Function (CSCF) 132, and a Policy Decision Function (PDF) 134, all of which may be part of the access provider network. Finally, the restrictive access system 100 may comprise a second IP network 140 and a service or application server 150 coupled to a second ER 152, which may reside at a core network. For instance, the application server 150 may be a Public Safety Answering Point-Gateway (PSAP-GW) coupled to the ER 152, both of which belong to an emergency service network. The various components of the restrictive access system 100 communicate with each other as shown in FIG. 1 and are described in further detail below.

In an embodiment, the UE 110 may be any user mobile device, component, or apparatus configured to communicate with the RG 112. The UE 110 may communicate with the RG 112 via a fixed link, such as an electrical or optical link. Alternatively, the UE 110 may communicate with the RG 112 via a wireless link. For instance, the UE 110 may be a cellular telephone, a personal digital assistant (PDA), a portable computer, or any other wireless device. The UE 110 may comprise an infrared port, a Bluetooth interface, an Institute of Electrical and Electronics Engineers (IEEE) 802.11 compliant wireless interface, or any other wireless communication system that enables the UE 110 to communicate wirelessly with the RG 112.

In an embodiment, the RG 112 may be any device, component, or network configured to allow the UE 110 to gain access to a home network or the access provider network. The RG 112 may comprise a router that allows the UE 110 to communicate with the access provider network. For instance, the RG 112 may comprise an IP router, such as a customer premises equipment (CPE) router or any router equipment located at a subscriber's premises and that communicates with a network. In an example, the RG 112 may be a Digital Subscriber Line (DSL) modem, a cable modem, or a set-top box. In another embodiment, the RG 112 may be a node that forwards IPv4 and/or IPv6 packets to and from the UE 110. In some embodiments, the RG 112 may comprise or may be coupled to a wireless termination point (WTP). The WTP may be any device, component, or network configured to establish a wireless link with the UE 110 and exchange communications with the UE 110. Additionally, the RG 112 may be configured to exchange authentication information with the UE 110 and/or with any component of the access provider network.

In an embodiment, the AN 120 may be any device, component, or network configured to transport communications between the RG 112 and the BNG 122. For example, the AN 120 may be a switch, a router, or a bridge, such as a Provider Edge Bridge (PEB) or a Provider Core Bridge (PCB). The AN 120 may be coupled to the RG 112 and the BNG 122 via wireless or fixed links, such as electrical or optical links. In some embodiments, the AN 120 may be configured to initiate or establish device authentication, line authentication, or both for the UE 110.

In an embodiment, the BNG 122 may be any device, component, or network configured to forward communications between the RG 112, via the AN 120, and the first IP network 128 or the access provider network. The BNG 122 may comprise a network access server (NAS), a bridge, a switch, or a router. For example, the BNG 122 may be a Broadband Routed Access Server (BRAS) as defined by the Broadband Forum or a Cable Modem Termination Server (CMTS). In another example, the BNG 122 may be a Back Bone Edge Bridge (BEB), a PEB, a PCB, or a user network interfaces (UNI). Alternatively, the BNG 122 may be a point-oriented wire-line node, such as a DSL connection or a provider network edge device. Additionally, the BNG 122 may exchange authentication information related to a home network component or an access provider network component, for example with the AAA server 126.

In an embodiment, the DHCP server 124 may be any device, component, or network configured to implement DHCP. DHCP is a protocol that may be used by networked computers or clients, such as the UE 110, to obtain an IP address, a default gateway, subnet mask, other parameters, or combinations thereof. In some embodiments, the DHCP server 124 may assign to the UE 110 an IP address lease comprising an IP address and an IP address lease time, which may be renewed at least one time. The DHCP server 124 may verify that an IP address assigned to the UE 110 is unique, i.e., that the same IP address is not assigned to another UE, and/or that the IP address lease time has not expired.

In an embodiment, the AAA server 126 may be any device, component, or server configured to implement an AAA protocol, which defines various mechanisms and policies for authentication, authorization, and accounting. The AAA server 126 may support the UE's 110 authentication to access the first IP network 128, for instance by exchanging some authentication information with the BNG 122. The AAA server 126 may also verify a claimed identity for the UE 110. For instance, the AAA server 126 may establish authentication by matching a digital identity, such as a network address, to a client information database. In other embodiments, the AAA server 126 may match credentials corresponding to the UE 110, such as passwords, one-time tokens, digital certificates, or phone numbers to the client information database. In terms of authorization, the AAA server 126 may determine if a particular right, such as access to some resource, can be granted to the UE 110. The AAA server 126 may grant specific types of privileges (including "no privilege") to the UE 110 based on the UE's 110 authentication, the privileges requested by the UE 110, the current system state, or combinations thereof. Authorization may be based on restrictions, for example tentative or emergency service access restrictions, time-of-day restrictions, physical location restrictions, or restrictions against multiple logins by the UE 110. Granting a privilege may comprise provisioning usage of a certain type of service, such as IP address filtering, address assignment, route assignment, Quality of Service (QoS) services, bandwidth control, traffic management, tunneling to a specific endpoint, and encryption.

In an embodiment, the first IP network 128 may be any type of network that exchanges IP data packets with other components described herein. For example, the first IP network 128 may be a Packet Switched Network (PSN), an intranet, an Internet, or a local area network (LAN). The first IP network 128 may be an Ethernet transport network, a backbone network, an access network, an optical network, a wire-line network, an IEEE 802 standard network, a wireless network, or any other IP based network.

In an embodiment, the first ER 130 may be any device, component, or network that transports communications between the first IP network 128 and the second IP network 140. For example, the first ER 130 may be a switch, a router, or a bridge, such as a PEB or a PCB. The ER 130 may be located at the access provider network and may be coupled to the second IP network 140 via wireless or fixed links, such as electrical or optical links.

In an embodiment, the CSCF 132 may be any device, component, or server configured to support signaling and control in a network, such as the first IP network 128. The CSCF 132 may use a Session Initiation Protocol (SIP), which is an Internet Engineering Task Force (IETF) protocol used to establish signaling between various network planes. For example, SIP may establish signaling between a Transport Plane, a Control Plane, and an Application Plane that may span the access provider network, the core network, or both. In some embodiments, the CSCF 132 may comprise a Proxy CSCF (P-CSCF), an Interrogating CSCF (I-CSCF), a Serving CSCF (S-CSCF), or combinations thereof.

The P-CSCF may be in charge of interfacing directly with the Transport Plane components. As such, the P-CSCF may be the first point of signaling for an end-point within the network. For instance, when the BNG 122 at the access provider network establishes a connection or a communication link with the UE 110, a registration event may be initiated by signaling the P-CSCF. The BNG 122 may discover the P-CSCF via the DHCP 124 or other discovery mechanisms. The P-CSCF may be in charge of policy decisions and may comprise the PDF 134. Alternatively, the P-CSCF may be coupled to the PDF 134 and may communicate with the PDF 134, for instance using a Common Open Policy Server (COPS) protocol. In another embodiment, the P-CSCF may communicate with a Policy Charging and Resource Function (PCRF), instead of the PDF 134, using a Remote Authentication Dial In User Service (RADIUS) or a DIAMETER protocol. Accordingly, the BNG 112 may act as a Policy Enforcement Point (PEP) to any policy that may be stipulated by the PDF 134 or the PCRF, which in turn act as Policy Decision Points (PDP). An example of a stipulated policy may be to establish or provision a certain rate or an amount of bandwidth for the UE 110 upon starting a communication session or during the session. The policy decisions for the session may be controlled by attributes set using a Session Description Protocol (SDP).

The I-CSCF may reside between the P-CSCF and the S-CSCF, which may act as an entry point and a control point, respectively, for an application in the Applications Plane. For instance, when the P-CSCF receives a registration request SIP message, it performs a Domain Name System (DNS) look-up to discover the appropriate I-CSCF to route the message. Once the I-CSCF receives the SIP message, it may perform a Home Subscriber Server (HSS) look-up, for instance using the Diameter protocol, to determine the S-CSCF that is associated with the end-point terminal (e.g. the BNG 112). The I-CSCF may hence forward the SIP message to the appropriate S-CSCF.

The S-CSCF may be in charge of interfacing with an Application Server (AS) in the Application Plane, for example with the service or application server 150 at the core network. Upon receiving a registration request SIP message from an I-CSCF, the S-CSCF may query the HSS via the RADIUS or Diameter protocol to register the end-point terminal (BNG 112) as being currently served. Registering the end-point terminal may be required for establishing and controlling subsequent sessions between the S-CSCF and the end-point terminal. As part of the registration process, the S-CSCF may use credentials, which may be obtained using the HSS query, to issue an SIP message to the P-CSCF requesting authentication of a user (e.g., UE 110) via the end-point terminal (BNG 112). Additionally, the S-CSCF may be in charge of routing the SIP message to the AS, thus allowing the Control Plane session control to interact with the Application Plane application logic. For instance, the S-CSCF may use information obtained from the HSS in the form of Initial Filter Criteria (IFC), which act as triggers against session establishment requests. The IFC may include rules that define how and where SIP messages may be routed to the AS residing in the Application Plane. The S-CSCF may also act on Secondary Filter Criteria (SFC) obtained from the AS.

In an embodiment, the PDF 134 may be any device, component, or server configured to implement or establish a plurality of policy control rules, which may be defined by an operator or a network management plane. The PDF 134 may receive an SDP session description from the P-CSCF comprising the established policy decisions. The PDF 134 may hence translate or convert the SDP session description into policy constraints, such as QoS parameters. The PDF 134 may use an Admission Control (AC) function to verify whether the resources needed for policy constraints are available in the core network, such as the emergency service network. The PDF 134 may verify the consistency between the authorized QoS based on the established policy decisions and the requested QoS by a user or an end-point terminal (e.g., UE 110 or BNG 112). Additionally, the PDF 134 may store information related to the session established for the UE 110, such as IP addresses, port numbers, bandwidth requirements, or combinations thereof. In some embodiments, the PDF 134 may also use an access resource control (ARC) function to verify whether the resources needed for policy constraints are available in the access provider network.

The second IP network 140 may be any type of network that exchanges IP data packets between the access provider network and the core network. For instance, the second IP network 140 may be configured similar to the first IP network 128. For example, the second IP network 140 may be a PSN, an Internet, a LAN, an Ethernet transport network, an IEEE 802 standard network, a wireless network, etc.

In an embodiment, the service or application server 150 may be any device, component, or server that may be configured to provide a service or an application to a user. The service or application server 150 may communicate with the second IP network 140 via the second ER 152, which may be similar to the first ER 130. The service or application server 150 may exchange communications with the UE 110 via the home network, the access provider network, and the second IP network 140. For instance, the service or application server 150 may be a PSAP-GW, which is used by a PSAP agency administered by county or city representatives. The PSAP-GW may be configured to answer 9-1-1 calls for emergency assistance or other emergency services from police, fire, ambulance stations or units, or combinations thereof. As such, the PSAP-GW may provide any needed emergency service or support to the UE 110.

The restrictive access system 100 may provide the UE 110 tentative or restricted authorization prior to authenticating the UE's 110 user. Specifically, the restrictive access network 100 may grant the UE 110 a default rate, which may be a reduced rate in comparison to a full rate provided after successfully authenticating the UE 110. In some embodiments, the restricted access may be defined by a lower quality of service (QoS), priority level, bandwidth rate, tolerated latency, tolerated jitter, or combinations thereof as compared with the full rate. Additionally or alternatively, the restricted access may be defined by restricted or limited authorization or permissions, such as access to a certain server (e.g. the service or application server 150), use of a certain network protocol, or both. The UE 110 may hence use such authorization or permissions to discover or obtain information about a location of the service or application server 150, to signal the service or application server 150, to access the service or application server 150, or combinations thereof.

For instance, during a 9-1-1 emergency call, the restrictive access system 100 may enable the UE 110 to access the PSAP-GW, even when the UE 110 is not subscribed or authorized for accessing the access provider network. Since the user is not authorized, device or line authentication may be established, instead of user authentication, by first granting the UE 110 the default or reduced rate. In FIG. 1, the UE 110 may communicate with the DHCP 124, via the BNG 122, using the reduced rate to obtain an IP address, as shown by the solid line. The reduced rate may be imposed by the BNG 122, the AN 120, or both, which may provision or allocate a limited bandwidth to the UE 110 accordingly. The UE 110 may start the emergency call by signaling to the CSCF 132 using the reduced rate, via the PDF 134, as shown by the dashed and dotted line. Hence, the flow policies may be set using the SDP, and installed at the BNG 122 for instance, to control the UE's 110 access to the PSAP-GW via the first IP network 128 and the CSCF 132, as shown by the dashed line. The UE 110 may also be authorized to use a Real-time Transport Protocol (RTP) to communicate with the PSAP-GW. Accordingly, the UE 110 may establish communications with the PSAP-GW to place the emergency call but not with other servers or components of the access provider network, which remain restricted to the UE 110.

Figure 2:
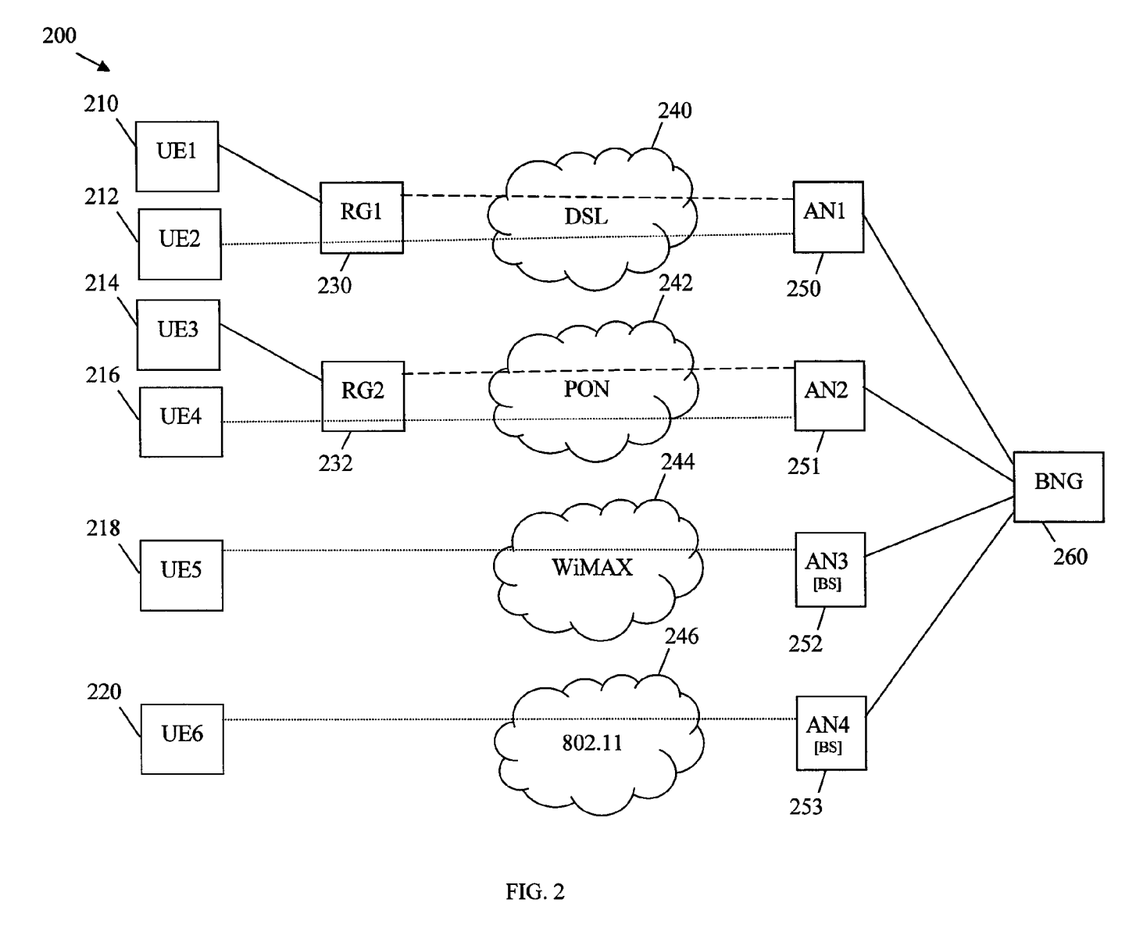
FIG. 2 is a schematic diagram of an embodiment of an access network based authentication system.

FIG. 2 illustrates an embodiment of an access network based authentication system 200, where at least one UE may be authenticated using one of a plurality of authentication types or mechanisms to access one of a plurality of access networks. The authentication types or mechanisms may include device authentication and line authentication. The access networks may include fixed IP networks and wireless networks. The access network based authentication system 200 may use either device authentication or line authentication to grant the UE access based on the type of the access network.

In an embodiment, the access network based authentication system 200 may comprise a plurality of UEs comprising a first UE (UE1) 210, a second UE (UE2) 212, a third UE (UE3) 214, a fourth UE (UE4) 216, a fifth UE (UE5) 218, and a sixth UE (UE6) 220 that may be configured similar to the UE 110, in addition to a first RG (RG1) 230 and a second RG (RG2) 232, which may be configured similar to the RG 112. The access network based authentication system 200 may comprise a plurality of access networks including a DSL network 240, a Passive Optical Network (PON) 242, a Worldwide Interoperability for Microwave Access (WiMAX) network 244, and an IEEE 802.11 network 246. Additionally, the access network based authentication system 200 may comprise a first AN (AN1) 250, a second AN (AN2) 251, a third AN (AN3) 252, and a fourth AN (AN4) 253 that may be configured similar to the AN 120, and a BNG 260 that may be configured similar to the BNG 122. The BNG 260 may be coupled to each of the AN1 250, AN2 251, AN3 252, and AN4 253. In other embodiments, the access network based authentication system 200 may comprise any number of UEs, RGs, access networks, ANs, or BNGs. In some other embodiments, the access network based authentication system 200 may comprise a Wireless Local Area Network (WLAN) (not shown in FIG. 2).

The UE1 210 may be coupled to the RG1 230 via a trusted link. A trusted link may be a fixed link that may be initially authenticated, may not require authentication, or both. The RG1 230 may be configured to communicate with the AN1 250 via another trusted link through the DSL network 240. The AN1 250 may forward communications from the UE1 210 to the BNG 260 via another trusted link. In such a case, the UE1 210 may initialize communications with the RG1 230 to access the DSL network 240. Since the UE1 210 uses the trusted link to communicate with the RG1 230 and since the RG1 230 uses a trusted link to communicate with the AN1 250, the UE1 210 may be granted access to the DSL network 240 upon authenticating the RG1's 230 access line (shown as a dashed line) to the DSL network 240, i.e., upon successful line authentication.

The UE2 212 may be a mobile or roaming UE, which may establish communications with the DSL network 240 via the RG1 230, for instance when roaming into an area around the RG1 230. The UE2 212 may use a non-trusted link, which may be a wireless link, to communicate with the RG1 230. The DSL network 240 may first need to confirm the UE2's 212 device identity to identify or authenticate the UE2 212. Additionally, the UE2 212 may establish communications with the AN1 250 via the DSL network 240 without using a dedicated access line (shown as a dotted line). Hence, since the UE2 212 uses a non-trusted link to communicate with the RG1 230 and communicates with the AN1 250 without using a dedicated access line, the UE2 212 may be authenticated using device authentication instead of line authentication to access the DSL network 240. Similarly, the UE3 214 and the UE4 216 may establish communications with the AN2 251 via the RG2 230 and the PON 242 using a trusted link with line authentication and a non-trusted link with device authentication, respectively.

On the other hand, the UE5 218 and the UE6 220, which may be mobile or roaming UEs, may access the WiMAX network 244 and the IEEE 802.11 network 246, respectively, without the means of an RG, for instance using wireless links. Accordingly, the UE5 218 and the UE6 220 may communicate with the AN3 252 and AN4 253, which may be base stations (BSs), via the WiMAX network 244 and the IEEE 802.11 network 246, respectively. Similar to the case of the mobile UE2 212 and UE4 216, the UE5 218 and UE6 220 may establish communications with the AN3 252 and AN4 253, respectively, without using dedicated access lines. As such, the UE5 218 and UE6 220 may also be granted access to the WiMAX network 244 and the IEEE 802.11 network 246, respectively, upon successful device authentication.

Figure 3:
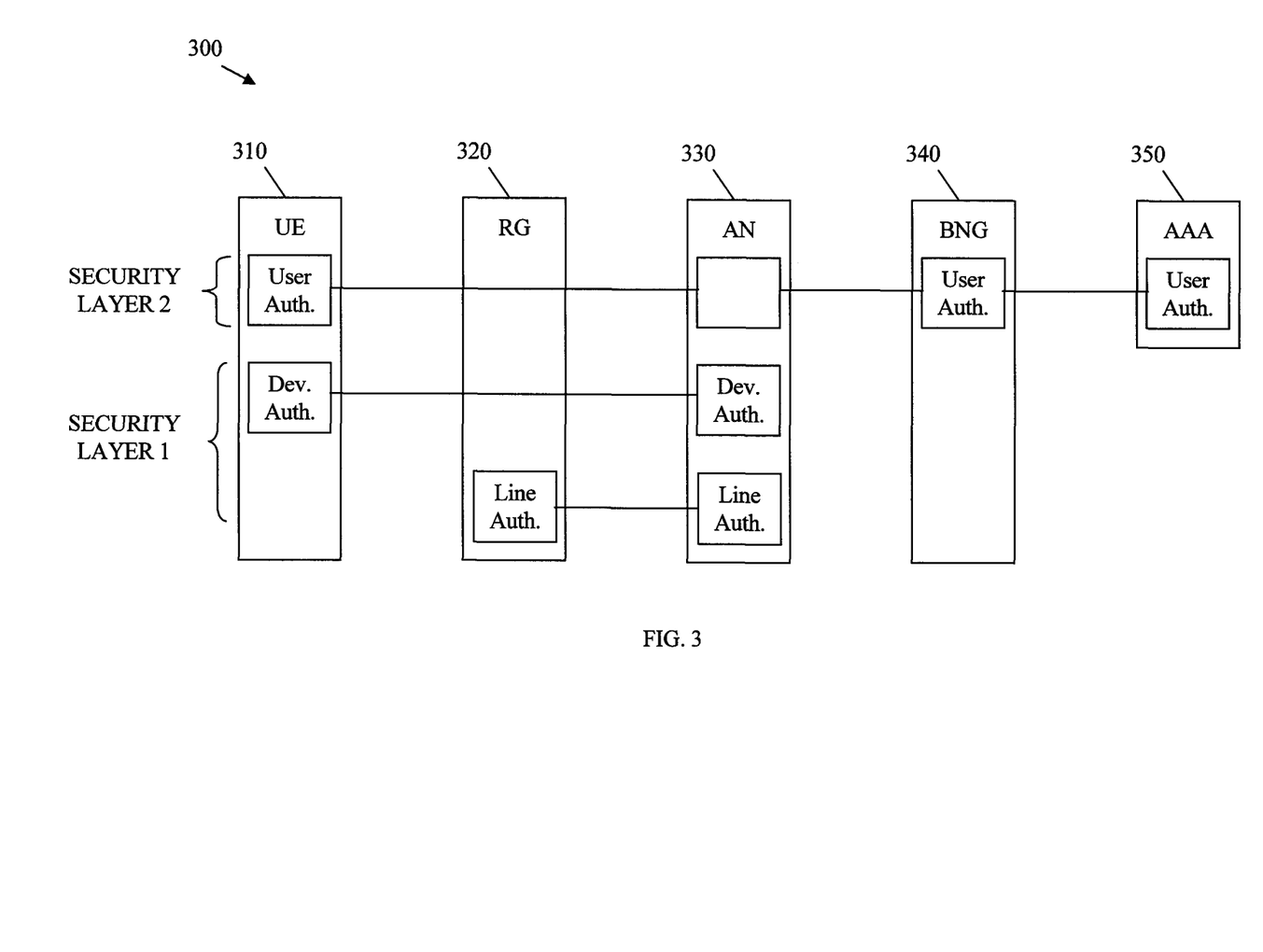
FIG. 3 is a schematic diagram of an embodiment of a multi-layer authentication network architecture.

FIG. 3 illustrates an embodiment of a multi-layer authentication network architecture 300. The multi-layer authentication network architecture 300 may support user authentication to grant a subscribed or an authorized user unrestricted access to a network. Additionally, the multi-layer authentication network architecture 300 may support device or line authentication to grant an unauthorized user restricted access to the network. The multi-layer authentication network architecture 300 may also support device authentication to grant a user access to the network via a non-trusted link, or line authentication to grant the user access to the network via a trusted link or an access line.

In an embodiment, the multi-layer authentication network architecture 300 may comprise a UE 310 that may be configured similar to the UE 110, an RG 320 that may be configured similar to the RG 112, an AN 330 that may be configured similar to the AN 120, and a BNG 340 that may be configured similar to the BNG 122. Additionally, the multi-layer authentication network architecture 300 may comprise an AAA server 350, which may be configured similar to the AAA server 126. In other embodiments, the multi-layer authentication network architecture 300 may comprise any number of UEs, RGs, ANs, or BNGs.

As shown in FIG. 3, the multi-layer authentication network architecture 300 may comprise two separate network layers for establishing user authentication and device or line authentication. The two separate network layers may be two security layers comprising different encryptions or security keys, two transport layers comprising two separate paths, tunnels, or links, or other types of network layers that may be established to separate communications corresponding to user authentication and device or line authentication. For instance, device or line authentication may be implemented at a first security layer (security layer 1), while user authentication may be implemented at a second security layer (security layer 2), which may be higher than the first security layer.

Figure 4:
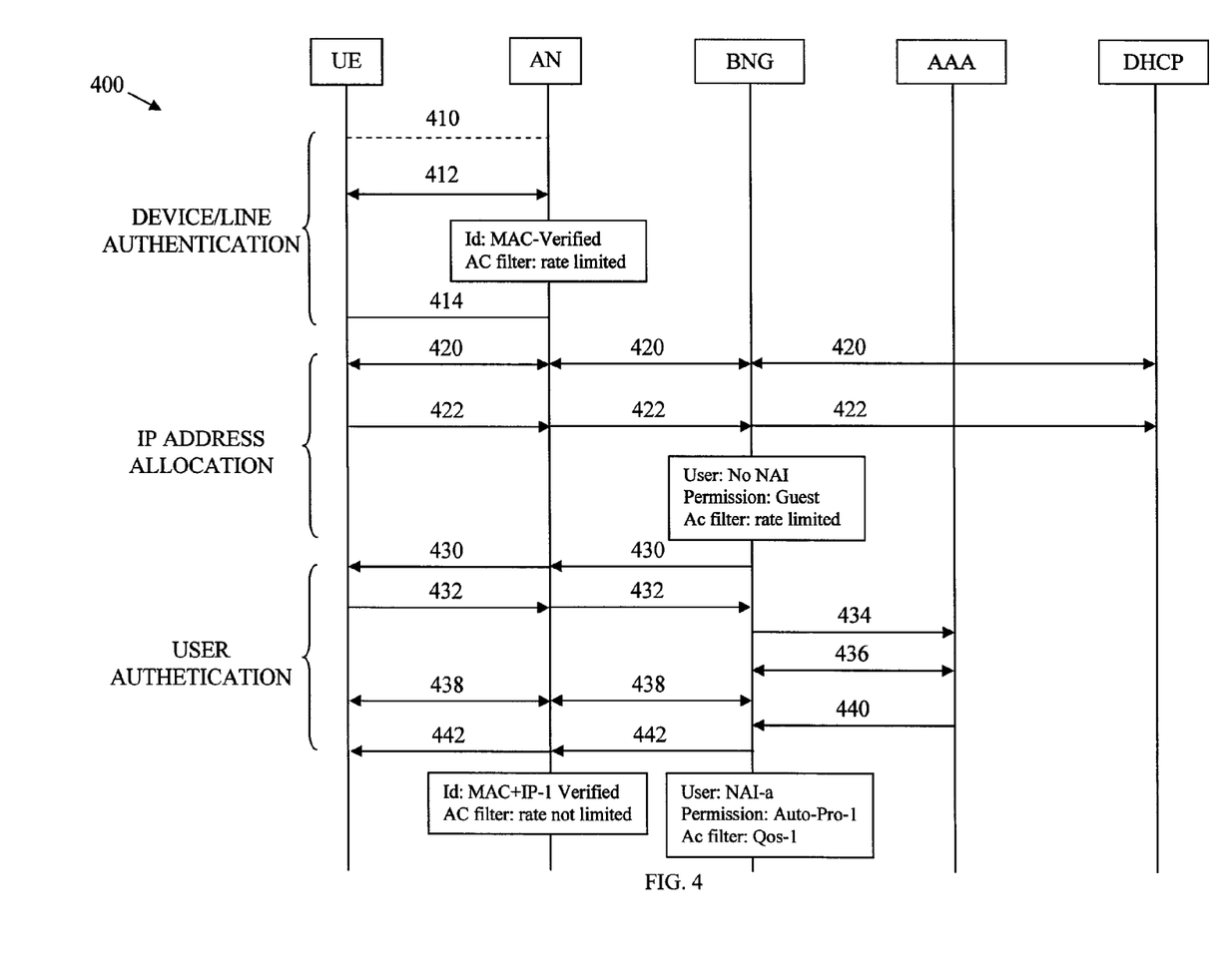
FIG. 4 is a protocol diagram of an embodiment of a control filter based access method.

In an embodiment, the UE 310 may establish a user session, such as a Layer Two (L2) Virtual Private Network (VPN) session, with the AN 330 (or L2 Edge) via the RG 320. Prior to such, the UE 310 may communicate with the RG 320 via a trusted link, and hence the AN 330 may use line authentication at the first security layer to grant the UE 110 access to the network. Alternatively, the UE 310 may roam into a coverage area of the RG 320 and communicate with the RG 320 via a non-trusted link, which may be a wireless link. Hence, the AN 330 may use device authentication to grant the UE 310 access to the network. Device authentication may be based on device credentials, such as a device signature or signatory known by the AN 330. As such, the UE 310 may be authenticated by the AN 330 at the first security layer without using an AAA lookup. A security lookup may comprise accessing the AAA server 350 to determine the user profile including user authorizations and access permissions. Additionally or alternatively, the UE 110 may be a subscriber and may establish an IP session with the BNG 340 (or IP Edge), via the AN 340. The BNG 340 may then authenticate the UE 110 using user authentication at the second security layer. User authentication may be based on an AAA lookup, where network access may be granted to the UE 110 upon verifying the user's subscription or authorization FIG. 4 illustrates an embodiment of a control filter based access method 400, which may be implemented to grant a UE access to a network using device or line authentication followed by user authentication. Specifically, the control filter based access method 400 may first establish device or line authentication using an L2 Edge (AN) to grant the UE restricted access. Next, the control filter based access method 400 may establish user authentication using an IP Edge (BNG) to determine whether to grant the UE unrestricted access. The UE may be granted restricted access using an AC filter and unrestricted access by removing or updating the AC filter.

In the method 400, the UE may be initially authenticated using device or line authentication. First, the UE may signal the AN, for example using an L2 discovery scheme, and establish an attachment 410 with the AN. The AN and the UE may establish a secured link 412, for example an IEEE 802.1ae security link or a Media Access Control (MAC) security (MACsec) link. In another embodiment, the secured link 412 may be based on a Layer One (L1) encryption scheme in a PON, for example. The AN may use the secured link 412 to authenticate the UE using device or line authentication. Hence, the AN may use an AC filter to grant restricted access to the UE. At the AN, the AC filter may comprise a reduced or limited rate, which may be set by the AN, a network manager, or operator. Additionally, the AC filter may be associated with the UE using a device identity (id), such as a MAC address. The UE may use the reduced rate to communicate with the AN via an encrypted channel 414.

The UE may then be allocated an IP address by a DHCP server. The UE and the DHCP server may first exchange a sequence 420, such as a DHCP discover/offer sequence, via a BNG to assign an IP address to the UE. The UE may then acknowledge receiving the IP address by sending, for example, a DHCP acknowledgement 422 to the DHCP server. At this point, an AC filter at the BNG may indicate granting guest privileges to the UE. The AC filter may comprise a reduced rate, which may be set by the BNG, the network manager, or the operator. Additionally, the AC filter may be associated with guest level permissions but with no user identity, for example no network address id (NAI) associated with the user.

The UE may then be authenticated using user authentication. As such, the BNG may forward a request message 430 to the UE via the AN, for instance using an Extensible Authentication Protocol (EAP) method, to request authentication and authorization information from the UE. The UE may respond by forwarding to the BNG a response 432 comprising the requested information. The BNG may forward the information to an AAA server using an access request message 434. In an embodiment, the access request message 434 may be forwarded using an EAP method and a RADIUS protocol. The AAA may then send back a response 436 to the BNG (e.g. using RADIUS and EAP) comprising the UE permissions and authorizations. The UE and the BNG may implement a sequence 438 (e.g. EAP sequence) to complete user authentication. Finally, the BNG may receive an access acknowledgement 440 from the DHCP (using RADIUS/DIAMETER and EAP), which may be forwarded in turn to the UE using, for instance, an EAP success message 442. At this point, the AC filters may be updated at the NA and the BNG to indicate unrestricted access with normal or assigned rates. For instance, the rate may be unlimited at the AN, and based on the UE's allocated QoS at the BNG. Additionally, the AC filters may be associated with the UE using, for instance, the UE's MAC address and IP address at the AN, and the UE's NAI at the BNG.

The control filter based access method 400 may establish device or line authentication before allocating an IP address for the UE and authentication the user. However, the control filter based access method 400 may allocate the IP address and complete user authentication in any order subsequent to device or line authentication. For instance, in some embodiments, the control filter based access method 400 may initiate IP address allocation and user authentication simultaneously after device or line authentication. In other embodiments, the control filter based access method 400 may establish user authentication after device or line authentication and before allocating an IP address for the UE.

Figure 5:
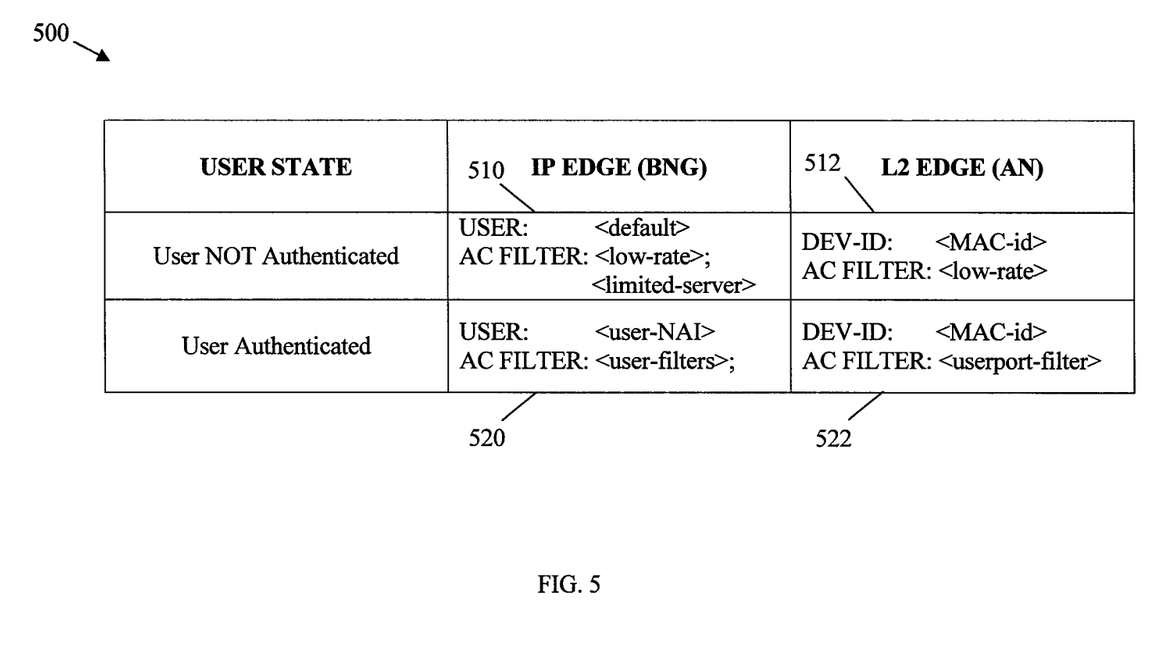
FIG. 5 is a table illustrating an embodiment of access control states.

FIG. 5 shows a table illustrating a plurality of access control states 500, which may be used to restrict or limit the UE's access to a network prior and following authentication, such as in the case of the control filter based access method 400. Specifically, the access control states may comprise two user states at the each of the AN and the BNG. A first state may represent the UE access control parameters prior to user authentication at the BNG and prior to device authentication at the AN. In another embodiment, the access control states at the AN and the BNG may represent the UE access control parameters prior to user authentication at the BNG and prior to line authentication at the AN. A second state may then represent the UE access control parameters after user and device or line authentications.

For instance, a first BNG state 510 may comprise a user identity set to default, which may be used for guest users prior to assigning an IP address. The first BNG state 510 may also comprise an AC filter, which may be set to a reduced or limited rate indicating a restricted user access. Additionally, the AC filter may comprise a limited server restriction indicating a restricted access to a certain server in the network, for example for emergency services. With respect to the AN, a first AN state 512 may comprise a device id, for instance that indicates the UE's MAC address in the absence of an assigned IP address. The first AN state 512 may also comprise an AC filter set to a reduced or limited rate. After successful user authentication, the user id may be updated and a second BNG state 520 may indicate the authenticated user, for instance using an NAI. The AC filter may also be updated to reflect an assigned rate based on the user's profile, for example. Similarly, the device id may be updated and a second AN state 522 may represent the authenticated device, for instance using a MAC address. The AC filter may also be updated to indicate an unlimited rate or an available rate, such as a rate based on the user port.

Figure 6:
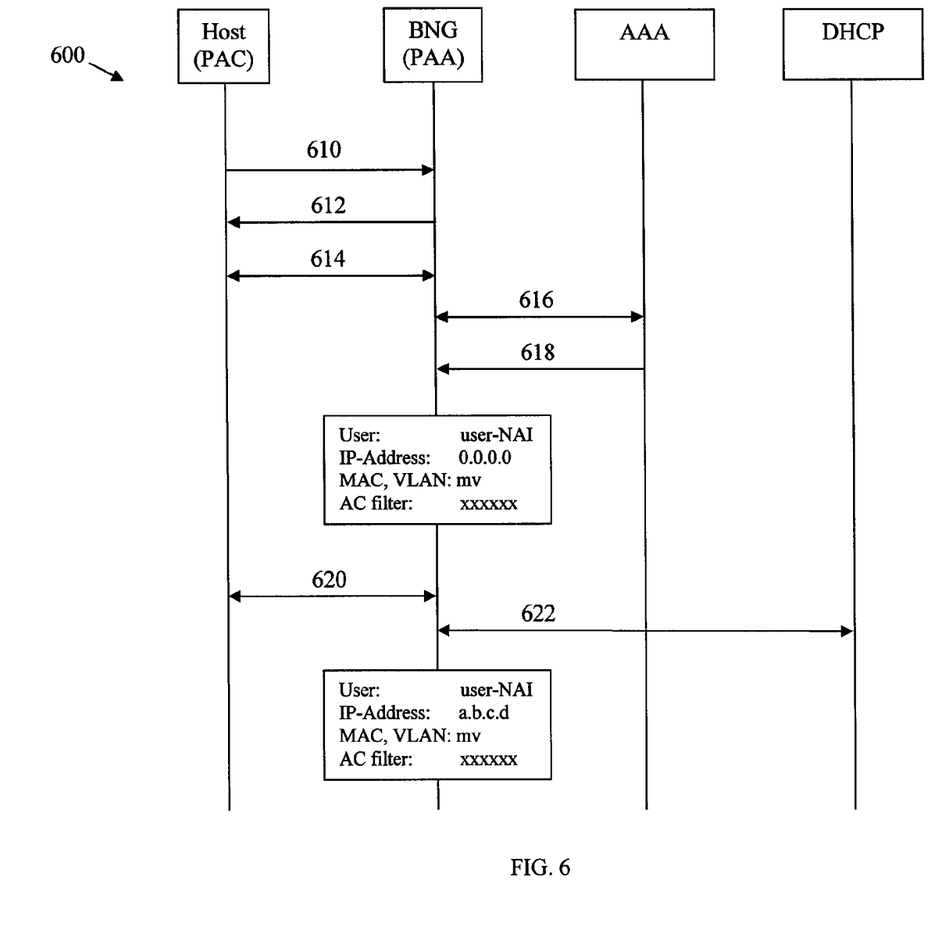
FIG. 6 is a protocol diagram of an embodiment of a protocol for carrying authentication for network access (PANA) based access method.

FIG. 6 illustrates an embodiment of a PANA based access method 600, which may be implemented to grant a UE access to a network using user authentication before allocating an IP address for the UE. Specifically, the PANA based access method 600 may first establish device or line authentication to grant restricted access to the UE. Next, the PANA based access method 600 may authenticate the UE's user using a temporary or default network address. Finally, the PANA based access method 600 may allocate an IP address for the UE and grant the UE network access. The PANA based access method 600 may be suitable for access networks such as some broadband networks where an EAP may be used or recommended.

PANA may be used to forward some of the authentication information related to the UE. The PANA may be implemented to allow a client, such as the UE, to authenticate itself to an access network using IP protocols. The PANA may allow the UE to interact with an AAA agent or server to gain access without the need to use or implement the particular AAA infrastructure protocols or a link-layer specific mechanism for a specific wireless technology. Specifically, the PANA may be implemented using a PANA Authentication Agent (PAA), such as a BNG, and a PANA authentication client (PAC), such as the UE or a component associated with the UE.

The PANA may authenticate the UE for network access and hence authorize the UE for communications using a secure channel. The PANA may enable establishing the secured channel between the UE and the network using Internet Protocol Security (IPsec). As such, the packets forwarded between the UE and the network may be protected. The IPsec may use an Internet Key Exchange (IKE) protocol, after successful PANA authentication, to generate encryption and authentication keys, and hence set up a secure IPsec communication session. Further, the PANA may enable transporting EAP payloads to establish the secure IPsec communication session. The EAP is a universal authentication framework used in wireless networks, such as WLANs, and Point-to-Point connections. The EAP may provide some common functions and negotiation for a desired authentication mechanism, also referred to as an EAP method, which may be defined by the IKE protocol. The PANA may need to assign a network address to the UE to implement the EAP. As such, the UE may be configured with a temporary network address, such as a temporary IP address, before using PANA. This network address may provide limited accessibility to the UE until establishing authentication using the PAA. Upon successful authentication, the UE may be granted broader network access by either a new network address assignment or enforcement points changing filtering rules for the same network address.

In the method 600, the PAC may discover the PAA, for instance by using a Pseudo-Random Downstream (PRD) sequence. The PRD sequence may comprise a request message 610 from the PAC to the PAA including an unspecified address, the PAC's MAC address and/or a virtual LAN (VLAN) address. The unspecified address may be an IP address in the "a.b.c.d" format, such as "0.0.0.0". Additionally, the PRD sequence may comprise a response message 612 from the PAA back to the PAC including a temporary, default, or reserved address, the PAA's MAC address and/or the VLAN address. The temporary address may also be an IP address in the "a.b.c.d" format, such as 255.255.255.255". In other embodiments, the PAC may obtain the PAA's address prior to initializing the method 600, and may hence skip the PRD sequence.

Next, a PANA authentication sequence 614 may be initiated between the PAC and the PAA, using the temporary assigned address, the MAC addresses, and/or the VLAN address. To complete user authentication, the PAA may exchange authentication information with an AAA server using another sequence 616 and the RADIUS protocol. The AAA server may send a success message 618 to the PAA upon successful user authentication. An AC filter at the BNG may be set or updated to indicate a normal or assigned rate. The AC filter may be associated with other access parameters including a user's NAI, the PAC's MAC address and/or VLAN address. Additionally, the previous access parameters may be associated with the temporary IP address. As such, the BNG may bind the PAC's access parameters to the temporary address.

Next, the PAC may be assigned a fixed network address that replaces the temporary network address. The PAC may exchange a first DHCP sequence 620 with the PAA, which in turn may exchange a second DHCP sequence 622 with a DHCP server. As such, the PAC may be allocated a fixed address, which may be an IP address in a format similar to that of the temporary address. The access parameters at the BNG may be updated to indicate the fixed assigned address instead of the temporary address. Hence, the BNG may bind the PAC's access parameters to the fixed address.

Figure 7:
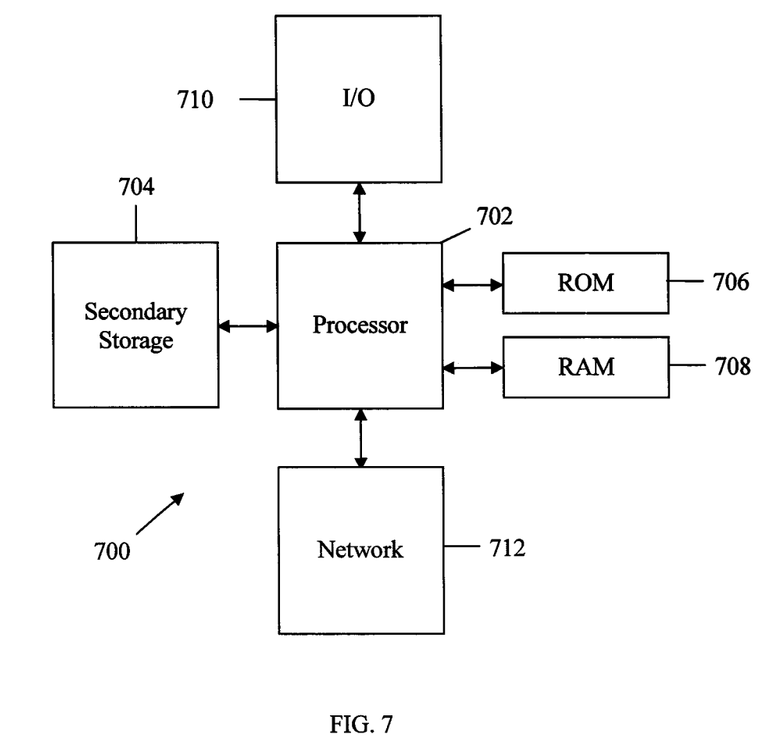
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a receiver;
   a transmitter; and
   at least one hardware processor coupled to the receiver and the transmitter, wherein the at least one hardware processor is configured to:
      receive, via the receiver, a message from a user device, wherein the user device has been authenticated using device authentication, line authentication, or both;
      grant a user of the user device restricted access at a reduced rate without authenticating the user;
      subsequent to granting the user restricted access, attempt to authenticate the user via the transmitter; and
      grant the user unrestricted access at a full rate if the user authentication is successful,
   wherein the user device is granted restricted access and the user is granted unrestricted access in a single communication session.

2. The network component of claim 1, wherein the user is authenticated using a protocol for carrying authentication for network access (PANA).

3. The network component of claim 2, wherein granting the user restricted access comprises granting the user a temporary or reserved network address.

4. The network component of claim 1, wherein the restricted access is limited to at least one server, at least one protocol, or both.

5. The network component of claim 1, wherein the restricted access comprises access to an emergency service network.

6. The network component of claim 1, wherein the reduced rate and the full rate are defined by a quality of service (QoS), a priority level, a bandwidth rate, a tolerated latency, a tolerated jitter, or combinations thereof.

7. The network component of claim 1, wherein the reduced rate and the full rate are controlled by a multi-rate access filter.

8. The network component of claim 1, wherein the user is granted no access if the authentication of the user device, user line, or both is not successful, and wherein the user retains restricted access if the user authentication fails.

9. A method comprising:
   authenticating a user device, a user line, or both using a first communication;
   if the authentication of the user device, user line, or both is successful, then granting a user associated with the user device, user line, or both restricted access to a network;
   subsequent to granting the user restricted access, authenticating the user using a second communication separate from the first communication; and
   if the authentication of the user is successful, then granting the user unrestricted access to a network,
   wherein the user device is granted restricted access and the user is granted unrestricted access as part of a single user session.

10. The method of claim 9, wherein authenticating the user device, the user line, or both does not comprise an Authentication, Authorization and Accounting (AAA) lookup.

11. The method of claim 9, wherein authenticating the user comprises an Authentication, Authorization and Accounting (AAA) lookup.

12. The method of claim 9 further comprising initiating the user session, wherein the user session is an Internet Protocol (IP) session, and wherein the user is authenticated at a Broadband Network Gateway (BNG).

13. The method of claim 9 further comprising initiating the user session, wherein the user session is a Layer Two Virtual Private Network (L2 VPN) session, and wherein the user is authenticated at an access node (AN).

14. The method of claim 9, wherein the user device, the user line, or both and the user are authenticated at separate network layers.

15. The method of claim 9, wherein the user is granted no access if the authentication of the user device, user line, or both is not successful, wherein the user is granted unrestricted access if authenticating the user is successful, and wherein the user retains restricted access if authenticating the user is not successful.

16. An access node (AN) comprising:
   a transmitter and a receiver, wherein the transmitter and receiver are configured to couple to an access network and communicate with a user equipment (UE) via the access network; and
   a hardware processor coupled to the transmitter and the receiver;
   wherein the UE is authenticated using either line authentication or device authentication based on the access network,
   wherein the hardware processor grants the UE restricted access via an Admission Control (AC) filter if the line authentication or device authentication is successful,
   wherein subsequent to granting the UE restricted access, a user associated with the UE is authenticated, and
   wherein if the user authentication is successful, updating or removing the AC filter to grant the UE unrestricted access.

17. The AN of claim 16, wherein the access network is a Digital Subscriber Line (DSL) network, a Passive Optical Network (PON), or a non-wireless access network, wherein the UE communicates with the access network via a residential gateway (RG), and wherein the RG is authenticated with the AN.

18. The AN of claim 17, wherein the UE communicates with the RG via a trusted link and is authenticated using line authentication.

19. The AN of claim 17, wherein the UE communicates with the RG via a non-trusted link and is authenticated using device authentication.

20. The AN of claim 16, wherein the access network is an Institute of Electrical and Electronics Engineers (IEEE) 802.16 network, an IEEE 802.11 network, a Wireless Local Area Network (WLAN), or a wireless access network, and wherein the UE is authenticated using device authentication.

21. The AN of claim 16, wherein the user is granted no access by the access network if the line authentication or device authentication is not successful.

\* \* \* \* \*